July 13, 1926.
S. B. ANDREWS
1,591,952
LOCOMOTIVE ENGINE CAB WINDOW
Filed April 7, 1925    2 Sheets-Sheet 1
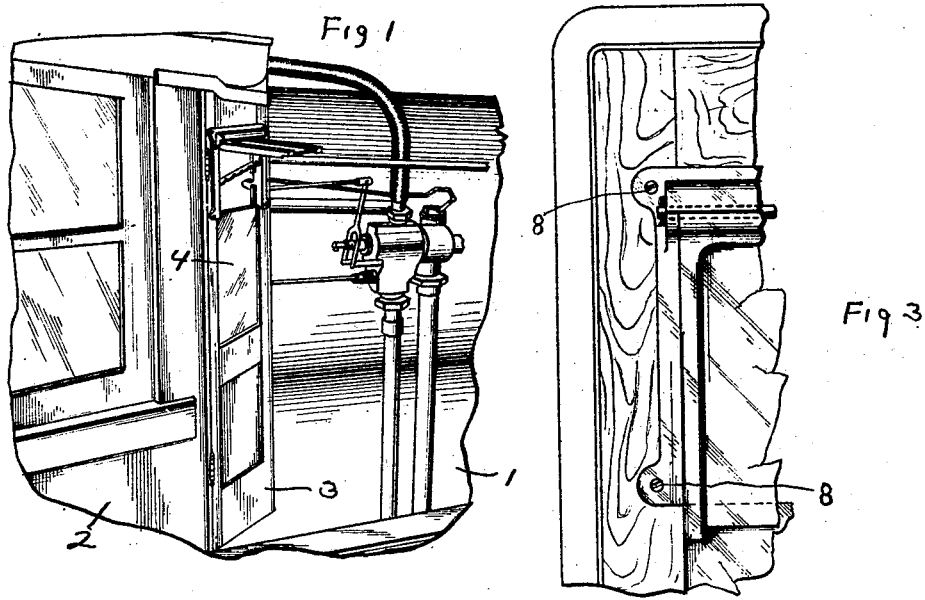
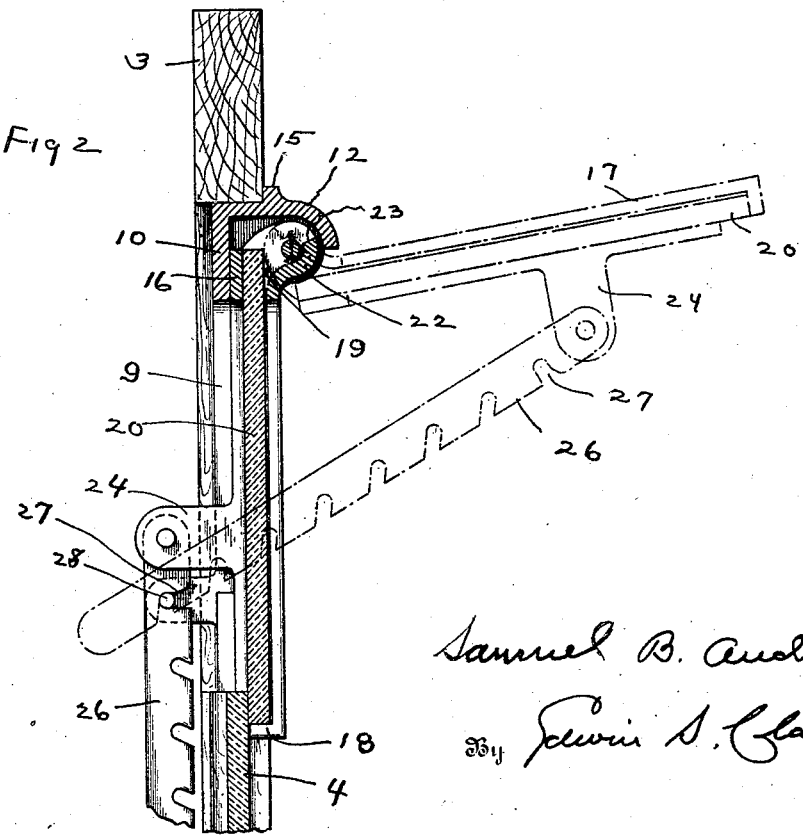

July 13, 1926.
S. B. ANDREWS
1,591,952
LOCOMOTIVE ENGINE CAB WINDOW
Filed April 7, 1925    2 Sheets-Sheet 2
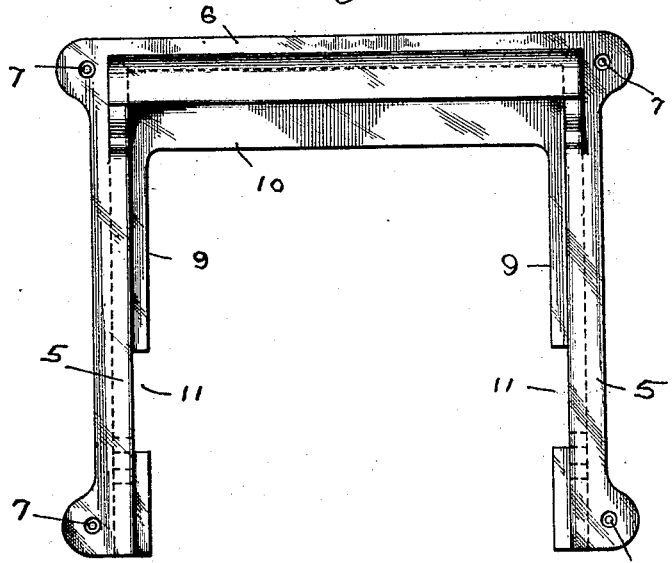
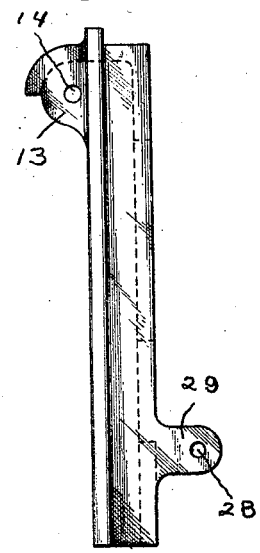
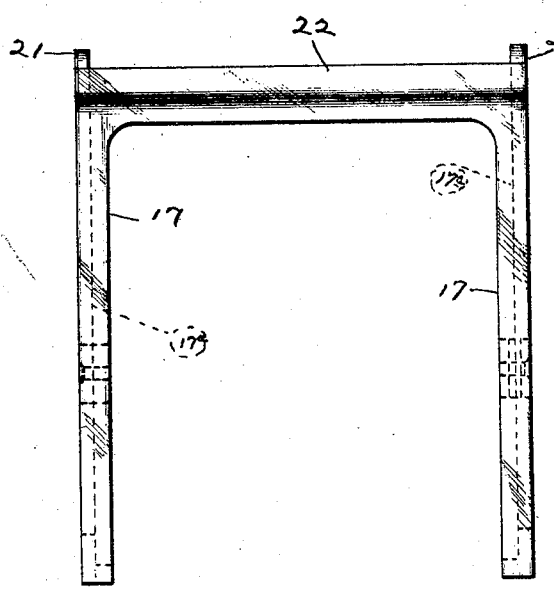
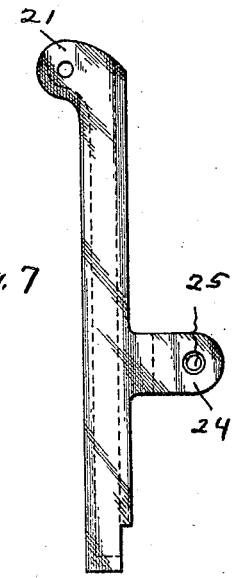
Inventor
Samuel B. Andrews
By Edwin S. Clarkson
Attorney Patented July 13, 1926.

1,591,952

UNITED STATES PATENT OFFICE.

SAMUEL B. ANDREWS, OF RICHMOND, VIRGINIA.

LOCOMOTIVE-ENGINE-CAB WINDOW.

Application filed April 7, 1925. Serial No. 21,441.

The law prohibits use of any locomotive unless all parts and appliances are in proper condition and safe to operate without unnecessary peril to life or limb. Openings in cabs, such as those around windows, doors, etc., which permit wind, rain, snow, and cinders, to enter the cab to the extent of dampening and wetting the engine men's clothes, which in many instances has been known to cause serious and fatal illness, is a distinctive violation of the law.

Considerable difficulty has been experienced in having clear vision windows constructed, located, and maintained in condition to properly perform their functions and prevent wind, rain, cinders, and snow from being blown into the cab to an unnecessary extent. Where clear vision windows are hinged at the top to a permanent frame, as practiced before my invention, there was usually found an opening varying from one-half to one inch in width, which permits the wind, rain, cinders, and snow that accumulate on top of the window, when open, and that which runs down from above, to be blown into the cab with serious and blinding effect.

The object of my invention is to provide a clear vision window for a locomotive engine cab that will be free from all of the objections heretofore experienced in such windows, and which will comply from every standpoint, with the requirements of the Bureau of Locomotive Inspection of the Interstate Commerce Commission.

A further object of my invention is to provide a clear vision window for a locomotive engine cab which in both its open and closed positions is provided with a tight joint at its top which will prevent the entrance of the elements and cinders at that point into the engine cab.

A further object of my invention is to provide such a clear vision window with means whereby it may be firmly and securely locked in its closed as well as its adjusted positions.

A further object of my invention is to provide a clear vision window for a locomotive engine cab of such construction that the transparent panel of the window may be readily inserted and removed and without the necessity of adjustment of any parts or the addition of attachments to hold the panel in place.

In the drawings:

Figure 1 is a detail perspective view showing a part of the locomotive engine cab and part of the locomotive with my invention embodied.

Figure 2 is a detail vertical section through a portion of the front door of the engine cab and my improved clear vision window.

Figure 3 is a detail front elevation of a portion of the front door of the cab with my invention in position.

Figure 4 is a front elevation of the window frame embodying my invention.

Figure 5 is a side elevation of Figure 4.

Figure 6 is a front elevation of my improved sash.

Figure 7 is side elevation of the same.

The reference numeral 1 designates a locomotive on which is mounted the usual engine cab 2 having the front door 3, said door having a transparent panel 4.

My improved clear vision window comprises a frame consisting of side members 5 and a top member 6. 7 are screw openings through which screws 8 pass to secure the frame to the door. The frame is provided with inwardly extending flanges 9 integral with the side members and an inwardly extending integral flange 10 on the top member which flanges function as sash stops. The flanges 9 are interrupted to form recesses 11 which will be hereinafter referred to.

Extending forwardly from the top member 6 is a hood 12 which hood also extends downwardly as clearly shown in Figure 2, said hood extending entirely across the frame, the hood being closed at its ends by side walls 13, which walls have a journal opening 14. On top of the hood is a stop 15 to limit the inward movement of the frame relative to the door 3, as will be readily understood.

The sash included in my invention is composed of a top rail 16 and side stiles 17, the stiles 17 being provided with grooves or slideways 17ª extending throughout their length, said ways being closed at the bottom by means of the lugs 18. The top bar of the sash is provided with a slot 19 extending lengthwise thereof and intercepting the slideways 17ª so that the transparent panel 20 may be slipped through the slot 19 into the slideways 17ª into proper position in the sash. Extending forwardly from the sash are arms 21 at the upper end of the sash between which arms extends a flange 22, which flange is of the general form of a compound curve and is of such width that the end 23 thereof is at all times within the housing 12 thereby seating the joint between the housing 12 and the sash to prevent the entrance of wind, rain, snow, and cinders at the top of the clear vision window.

Extending rearwardly from the sash are lugs 24 having perforations 25 to which lugs a notched bar 26 is pivotally secured at one end. The notch 27 in the bar near its pivoted end is of cam shape so that when the sash is in closed position this cam notch will have a camming action with the pin 28 to draw the sash snugly and tightly into its closed position and lock it. The pin 28 is mounted on a rearwardly extending lug 29 on the window frame. The notched bar 26 slides in the recesses 11 of the flange 9. In Figure 4 I have shown both side members of the window frame provided with recesses 11 and also provide lugs 29 on each side of the frame and lugs 24 on each side of the sash. The purpose of this is to enable one to use the notched bar on the right or left-hand side of the sash as may be found most convenient.

It will be noted from Figure 2 that the construction of the sash is such that the transparent panel 20 may be easily inserted and removed from the sash without removing any of the parts, and when inserted is securely held in position. Even when the sash is moved to its uppermost limit the transparent panel cannot accidentally slide out of the sash because of the depth of the flange 10 on the window frame.

This invention has been found by actual use to comply with all the requirements of the Bureau of Locomotive Inspection of the Interstate Commerce Commission.

I am aware that changes may be made in the details of construction within the spirit of my invention and without departing from the scope of the appended claim.

What I claim is:

A clear vision window construction for a locomotive cab, comprising a frame having top and side members, a hood extending forwardly and downwardly from the top member of the frame, a stop extending vertically from the top of said hood and a sash having top and side members slideways in the side members of the sash and a stop at the bottom of said slideways, an elongated slot through the top member of the sash into which the slideways merge whereby a pane of glass may be passed through the slot into said slideways and rest at its bottom edge on said stops, arms extending forwardly from ends of the side members of the sash and a flange extending outwardly and upwardly from the top member of the sash and integral at its ends with said arms, the said flange and the inner face of said hood having a tight sliding contact with each other, and means pivotally connecting the sash at its upper end to the frame, and means to hold the sash in an adjusted position.

In testimony whereof I affix my signature.

SAMUEL B. ANDREWS.